United States Patent [19]
Fitch et al.

[11] 4,235,281
[45] Nov. 25, 1980

[54] CONDENSER/EVAPORATOR HEAT EXCHANGE APPARATUS AND METHOD OF UTILIZING THE SAME

[75] Inventors: Robert E. Fitch, Kent; Clifford R. Perry, Renton, both of Wash.

[73] Assignee: The Boeing Company, Seattle, Wash.

[21] Appl. No.: 894,253

[22] Filed: Apr. 7, 1978

[51] Int. Cl.³ .......................... F28B 9/04; F28D 3/04; F28F 3/12
[52] U.S. Cl. ...................................... 165/1; 165/115; 165/118; 165/165; 165/170; 165/171; 165/174; 165/DIG. 8
[58] Field of Search ............... 165/110, 114, 115, 118, 165/166, 170, DIG. 8, 165, 171, 174, 1; 62/52

[56] References Cited

U.S. PATENT DOCUMENTS

| | | | |
|---|---|---|---|
| 1,694,370 | 12/1928 | Burdick | 165/118 |
| 3,315,739 | 4/1967 | Kearney | 165/165 |
| 3,371,709 | 3/1968 | Rosenblad | 165/115 |
| 3,473,604 | 10/1969 | Tiefenbacher | 165/166 |
| 3,493,040 | 2/1970 | Davidson | 165/115 |
| 4,119,140 | 10/1978 | Cates | 165/DIG. 8 |
| 4,133,377 | 1/1979 | de Lallee et al. | 165/118 |

FOREIGN PATENT DOCUMENTS

2289870 10/1974 France ....................................... 165/165

Primary Examiner—Sheldon Richter
Attorney, Agent, or Firm—Hughes & Barnard

[57] ABSTRACT

A condenser/evaporator heat exchanger comprising a plurality of vertically oriented panel units spaced moderately from one another. Each panel unit comprises a pair of thin film plastic sheets bonded to one another along a plurality of vertically extending bond lines transversely spaced from one another at regular intervals. The two sheets form between adjacent pairs of bond lines a plurality of vertical tubular condensing chambers adapted to receive pressurized steam. Brine is directed onto the outer surfaces of the panel units at the upper ends thereof, the brine descending down the outer surfaces of the panel units to be in heat exchange relationship with the steam inside the tubular condensing chambers.

7 Claims, 8 Drawing Figures

CONDENSER/EVAPORATOR HEAT EXCHANGE APPARATUS AND METHOD OF UTILIZING THE SAME

BACKGROUND OF THE INVENTION

A. Field of the Invention

The present invention relates to condenser/evaporator heat exchangers and to a method of using the same.

B. Brief Description of the Prior Art

Since the present invention is well adapted for use in conjunction with heat exchange systems where saline or brackish water is converted to potable water, the general state of the prior art with regard to heat exchangers will be given consideration with reference to such systems. A common arrangement for such systems is to employ two distinct heat exchangers. The first heat exchanger is generally a counterflow heat exchanger and is used to place the brine which is initially flowing into the system in heat exchange relationship with the potable water flowing from the system to transfer the heat from the potable water to the incoming brine and raise its temperature from ambient temperature to a higher temperature, possibly in the order of 200° F. or so. The second heat exchanger is a condenser/evaporator type heat exchanger where the brine is pumped to the upper end of the heat exchanger and caused to fall as a thin film over one side of a set of heat exchange surfaces. At the same time, steam which is derived by heating the brine is compressed to a higher pressure and exposed to the opposite side of the heat exchange surfaces to be in heat exchange relationship with the brine film. This causes potable water to condense on the second set of surfaces and also causes evaporation of water from the brine flowing downwardly on the opposite side. This condensed water is collected and passed out through the first counterflow heat exchanger to raise the temperature of the incoming brine as described above.

In general, there have been two common arrangements for the elements which provide the heat exchange surfaces. One is to provide a plurality of plates arranged parallel to one another and spaced a short distance from each other, so that a plurality of adjacent passageways are formed by the various sets of plates; this is commonly called a flat plate heat exchanger. One heat exchange medium is directed through a first set of alternately spaced passages, while the second heat exchange medium is directed through the second set of passageways spaced intermittently with the first set. Thus, heat is transferred from one heat exchange medium to the other through the plates.

The second general arrangement for heat exchangers is to provide the heat exchange elements in the form of elongate tubes which extend through a heat exchange chamber and are spaced a moderate distance from one another. One heat exchange medium is directed into the interior of the tubes, while the other heat exchange medium is directed into the area between and around the outside of the tubes. In some instances, the second heat exchange medium flows in a direction transverse to the longitudinal axes of the tubes, and in other arrangements, the second heat exchange medium is directed parallel to the longitudinal axes of the tubes.

Since one of the main factors influencing the effectiveness of the heat exchanger is the heat transfer characteristics of the material separating the two heat exchange mediums, it has been quite common to fabricate the heat exchange elements from a metal which has a high thermal conductivity. However, for massive heat exchange installations, such as those used in producing potable water from saline water, the cost of providing and maintaining heat exchange elements in a quantity and size necessary to provide the heat exchange surface required, is a significant factor in determining whether the overall heat exchange system is economically feasible. This becomes particularly critical where metal is used as the material for the heat exchange elements, since the fabrication and installation of a vast number of metallic heat exchange elements can become a substantial portion of the cost of the entire system.

Accordingly, there have been attempts in the prior art to fabricate the heat exchange elements from other materials, and one of the results is research and development work in thin plastic film heat exchangers. Since plastic, in comparison to metal used in heat exchangers, is a relatively poor conductor of heat, for such films to operate with reasonable effectiveness, it is necessary to make the films quite thin to obtain adequate transfer of heat. The result is that the film material is generally relatively flexible and fragile in comparison to comparable metal heat exchange structures. When the thin film plastic is arranged as planar sheets to form the heat exchange surfaces (in the general configuration of metal panels), it becomes difficult to maintain the sheets in proper spaced relationship with respect to one another. One of the reasons for this is that to operate the heat exchanger, either as a counterflow heat exchanger or an evaporative type heat exchanger it is generally necessary to have at least some pressure differential between the two heat exchange mediums.

It has also been attempted in the prior art to provide thin film plastic heat exchangers in the form of tubular heat exchange elements. This alleviates to some extent the problem posed by pressure differential between the heat exchange mediums, since the higher pressure heat exchange medium can be directed into the interior of the tubes which are then caused to assume a generally circular configuration in response to the internal pressure. However, for practical commercial operation, these tubes must be provided in relatively long lengths, and there are quite often problems of instability in the tubes oscillating or becoming positioned against one another in response to the influence of the flow of the heat exchange medium or mediums either through or around the tubes. Not only does this create problems in preserving the structural integrity of the heat exchange structure, but it also creates a problem in the optimization of the heat transfer characteristics of the heat exchanger.

With regard to the various heat exchange devices shown in the literature of United States patents, the following are noted:

U.S. Pat. No. 1,955,261, Tryon et al, shows a heat exchanger where there are a plurality of tubes which are arranged in an alternating pattern and cast into a block made of a suitable metal, such as aluminum or copper.

U.S. Pat. No. 2,347,957, McCullough, shows a heat exchanger comprising a tubular member arranged in a circuitous pattern and having a number of fins extending therefrom to improve heat transfer.

U.S. Pat. No. 3,161,574, Elam, shows a condensor type heat transfer device where thin film plastic tubes are used as the heat exchange elements. Pressurized steam is directed into the interior of the tubes, and brine is directed as a film over the outside surface of the tubes.

U.S. Pat. No. 3,315,740, Withers, shows a heat exchanger made up of a tube bundle. The ends of the tubes are gathered together in a manner to form a fluid tight end portion of the tubular heat exchanger.

U.S. Pat. No. 3,493,040, Davison, shows a plate-type heat exchanger where the plates are formed with dimples to provide for proper spacing of the plates.

U.S. Pat. No. 3,537,935, Withers, shows a heat exchanger formed with plastic tubes, with one heat exchange medium being directed through the tubes and the other heat exchange medium being directed along a path transverse to the lengthwise axis of the tubes, commonly called a crossflow heat exchanger.

U.S. Pat. No. 3,616,835, Laurenty, is generally representative of a flat plate type heat exchanger.

U.S. Pat. No. 3,790,654, Bagley, teaches a method of extruding thin-walled honeycombed structure. While the teaching of this patent is not directed specifically toward heat exchangers, it does state that such honeycomb structures are used in reginerators, recuperators, radiators, catalyst carriers, filters, heat exchangers and the like.

U.S. Pat. No. 3,825,460, Yoshikawa et al, shows a carbonaceous honeycomb structure where tubular-like elements are formed into a variety of structures having elongate passageways, some of which are triangular, some of which are circular, and some of which are hexagonal.

U.S. Pat. No. 3,926,251, Pei, shows a counterflow heat exchanger where circular tubes are laid down, then expanded into contact with one another. In one embodiment, the tubes are arranged in a pattern so that the end passageways are formed as squares. In another configuration the tubes are arranged so that the end configuration of the passageways are hexagonal.

U.S. Pat. No. 3,948,317, Moore, discloses glass-ceramic tubes which are formed into a honeycomb configuration for use as heat exchangers.

U.S. Pat. No. 3,983,283, Bagley, discloses a ceramic honeycomb structure for use as a catalytic convertor or heat exchanger.

U.S. Pat. No. 4,002,040, Munters, shows a cross-current heat exchanger, where an airstream is cooled by evaporating moisture into a second air stream placed in heat exchange relationship with the first air stream.

U.S. Pat. No. 4,029,146, shows several configurations of a corrogated metal panel used as a heat exchanger.

The following patents are noted as broadly representative of various prior art devices: U.S. Pat. No. 2,820,744, Lighter; U.S. Pat. No. 3,168,450, Black; U.S. Pat. No. 3,239,000, Meagher; U.S. Pat. No. 3,367,843, Clive et al; U.S. Pat. No. 3,396,785, Kirsch; U.S. Pat. No. 3,428,529, Gumucio; U.S. Pat. No. 3,672,959, Sweet; U.S. Pat. No. 3,703,443, Evans; and U.S. Pat. No. 3,929,951, Shibata et al.

SUMMARY OF THE INVENTION

The heat exchange apparatus of the present invention is particularly adapted for use as a condenser/evaporator heat exchanger, by which a liquid evaporating medium, such as brine, is placed in heat exchange relationship with a pressurized gaseous condensing medium, such as steam. The apparatus comprises a heat exchange section having a vertical axis, a horizontal "X" axis, and a horizontal "Y" axis perpendicular to the "X" axis. The heat exchange section comprises a plurality of heat exchange panel units, each of which has an upper end and a lower end.

Each panel is made up of a pair of thin film sheets having inner and outer surfaces and aligned with one another along the vertical axis and the horizontal "X" axis. The two sheets are joined to one another at their inner surfaces along a plurality of vertically extending bond line portions spaced from one another at generally regular intervals along the horizontal "X" axis.

The two sheets define therebetween a plurality of vertical tubular condensing chambers adapted to receive the pressurized gaseous medium therein. Each chamber is defined by inner surfaces of two single thickness sheet portions of the two sheets, and each chamber is separated from an adjacent chamber of the same panel unit by a related double thickness bond line portion of the two sheets.

The panel units are aligned generally parallel to the vertical axis and the "X" axis, with the panel units being positioned adjacent one another and spaced from one another at generally regular intervals along the "Y" axis so as to provide pairs of adjacent panel units. With this arrangement, each pair of adjacent panel units defines therebetween an evaporating area.

There are provided means to direct the pressurized gaseous condensing medium into the condensing chambers. There is also means to direct the liquid evaporating medium as a falling liquid film onto the outer surfaces of the panel units at the upper end thereof. In this manner, the liquid medium is placed in heat exchange relationship with the gaseous medium across the single thickness sheet portions defining the condensing chambers.

In one configuration, the panel units are arranged relative to each other so that the chambers of adjacent panel units are arranged in a generally rectangular configuration. Thus, the condensing chambers are arranged in rows generally parallel to the "X" axis and parallel to the "Y" axis.

In a second configuration, alternate panel units are offset from one another along the "X" axis in a manner that condensing chambers of a first set of alternate panel units are offset along the "X" axis from the condensing chambers of a set of second alternate panel units positioned intermittently with the first set of panel units. The amount of offset is equal to a distance of approximately one half of the spacing of the condensing chambers of a single panel unit.

In a preferred form, the sheets are made of a thin film plastic material having a thickness dimension between about 0.0005 to 0.01 inch, and desirably between about 0.002 to 0.004 inch. The bond line portions of each of the panel units have a width dimension between about 0.02 to 0.40 inch and desirably between about 0.05 to 0.10 inch. The diameter of each of the condensing chambers is between about 0.25 2.0 inch, and desirably between about 0.75 to 1.5 inch.

In the method of the present invention, there is first provided the apparatus as described above. Then, the pressurized gaseous condensing medium is directed into the condensing chambers. At the same time the liquid evaporating medium is directed as falling films onto the outer surfaces of the panel units at the upper ends thereof.

Other features of the present invention will become apparent from the following description.

chambers 30 passes through the openings 64 to collect in the chamber 66. This condensate (i.e. potable water) is then discharged through a suitable condensate outlet conduit 68.

At locations between the lower edges of the panel units 20, there is a plurality of tubes 70 extending from the upper partition 60 through the condensing chamber 66 and also through the lower partition 62. The lower end of these tubes 70 open into a chamber 72 defined on the top side by the lower partition 62, and on the bottom side by a bottom wall 74 of the housing 12, and on the side by the housing wall located between the lower partition 62 and the bottom wall 74. The brine which descends down the outer surfaces 56 of the panel units 20 passes through these tubes 70 and into the chamber 72 to collect in a brine sump 76 in the lower part of the chamber 72. The steam which evaporates from the falling film of brine passing over the surfaces 56 also passes through these tubes 70 and collects in the upper portion of the chamber 72 above the upper surface 78 of the brine in the sump 76.

The brine from the sump 78 is directed through a conduit 80 located at the bottom wall 72 through a recirculating pump 82 which directs the brine upwardly and through the inlet conduit 50 into the upper brine manifold chamber 48. The steam collected immediately above the brine sump 76 is directed outwardly through a steam outlet conduit 84 to a steam compressor 86. The steam pressurized by the compressor 86 is directed into the aforementioned steam inlet conduit 46 to pass into the steam manifold chamber 44.

To summarize the overall operation of the apparatus of the present invention, brine is initially fed into the apparatus 10 through a brine inlet conduit 88 which directs the brine into the sump 76. The brine is then directed from the sump 76 through the conduit 88 to be recirculated by the pump 82 into the upper brine manifold chamber 48. The brine in the chamber 48 passes downwardly through the feed tubes 52 to be distributed along the outer surfaces 56 of the panel units 20. As the brine passes as a thin film downwardly over the surfaces 56, steam evaporates from the brine into the evaporating area 90, this area 90 being the various spaces located between adjacent panel units 20.

The brine which passes downwardly along the entire length of the panel units 20 passes through the lower tubes 70 into the sump 76 to be recirculated back through the system by the pump 86. The steam which evaporates from the falling film of brine passes from the evaporating area 90 downwardly through the tubes 70 into the upper portion of the chamber 72. The steam passes from this upper chamber area 72 through a steam outlet conduit to be compressed by the compressor 86 and directed into the upper steam manifold chamber 44. The steam from the manifold chamber 44 passes through the openings 40 into the condensing chambers 30. Since the pressurized steam in the chambers 30 is at a higher temperature than the brine on the outer surfaces 56 of the panels 20, the steam condenses on the inner surfaces 32 of the condensing chambers 30, with the heat from the steam condensate being transferred through the sheet portions 28 to the falling film of brine to cause further evaporation of steam from the brine. The condensate which forms in the condensing chambers 30 passes through the openings 64 into the condensate collecting chamber 66. The condensate from this chamber 66 is discharged through the outlet conduit 68.

In a typical commercial installation, while not being necessarily limited to these dimensions, the length of the panel units 20 could be between about 8.0 and 30.0 feet, and the width dimension of each panel unit 20 between about 1.0 to 10.0 feet. Typically, these sheets 20 and 24 which form the panel units 20 could be made of 2 to 4 mil TEDLAR (a trademark identifying a polyvinyl fluoride type plastic material), and could be made as thin as practical, consistent with the operational requirements of the end configuration. The thickness of the sheets can be between about 0.0005 to 0.02 inches, and desirably between about 0.002 to 0.006 inch, with a sheet thickness of 0.004 inch being suitable for a number of applications.

The width dimension of each bonded portion 26 of the panel unit 20 (this being indicated at "a" in FIG. 2) could be between about 0.02 to 0.4 inch, and desirably between about 0.05 to 0.10 inch. The diameter of the condensing chambers 30 could be between about 0.25 to 2.0 inch, and desirably between about 0.75 to 1.5 inch. The spacing of the panel units 20 from one another (i.e. the spacing along the horizontal "Y" axis, measured from center line to center line of two adjacent panel units 20) could be between about 0.20 to 3.0 inches depending upon configuration (reference FIGS. 2 and 5) and chosen condensing chamber dimension, and desirably about 0.5 to 1.0 inches.

Figure 5:
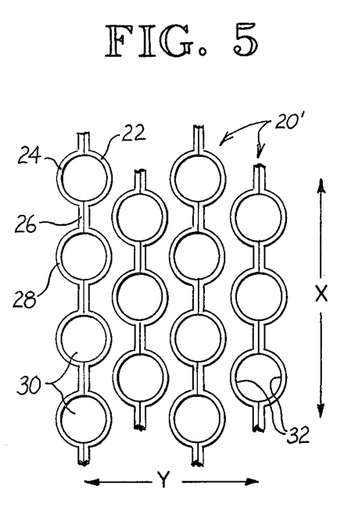
FIG. 5 is a top plan view of four of the panel units in a modified arrangement.

A modified arrangement of the panel units 20 is shown in FIG. 5. In this configuration, every other panel unit 20 is offset from the two adjacent panel units 20 in a direction along the horizontal "Y" axis a distance equal to one half the spacing between the center lines of two adjacent condensing chambers 30 of a single panel unit 20. This staggered arrangement of the condensing chambers 30 of the panel units 20 permits moderately closer spacing of the panel units 20 with respect to the horizontal "Y" axis, while maintaining adequate spacing between any two adjacent condensing chambers of contiguous panel units 20.

While the present invention has been described in terms of utilizing thin film plastic sheets to form the panel units 20, it is to be understood that within the broader aspects of the present invention, other materials could be used, provided such materials have proper heat exchange and structural characteristics.

Figure 6:
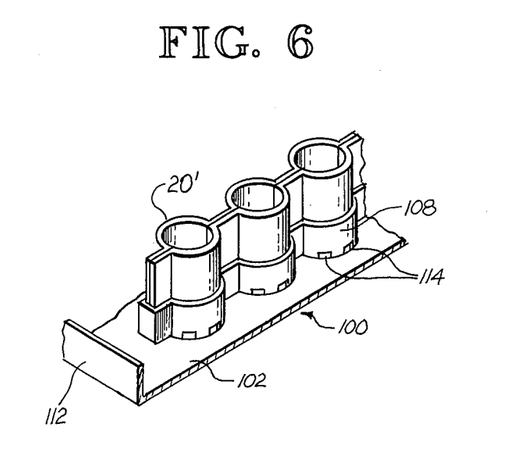
FIG. 6 is an isometric view of a portion of a modified structure to direct the liquid medium against the panels.
Figure 7:
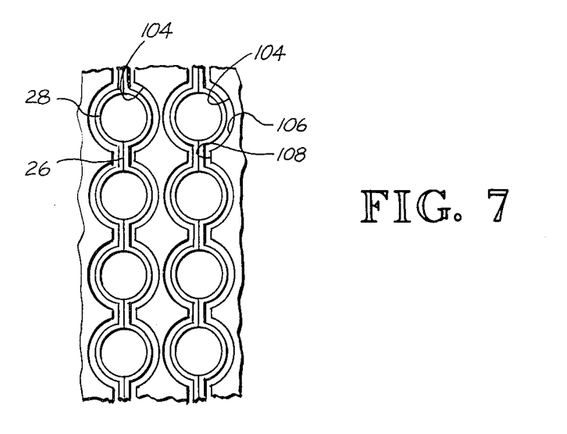
FIG. 7 is a top plan view of a portion of the manifold structure shown in FIG. 6.
Figure 8:
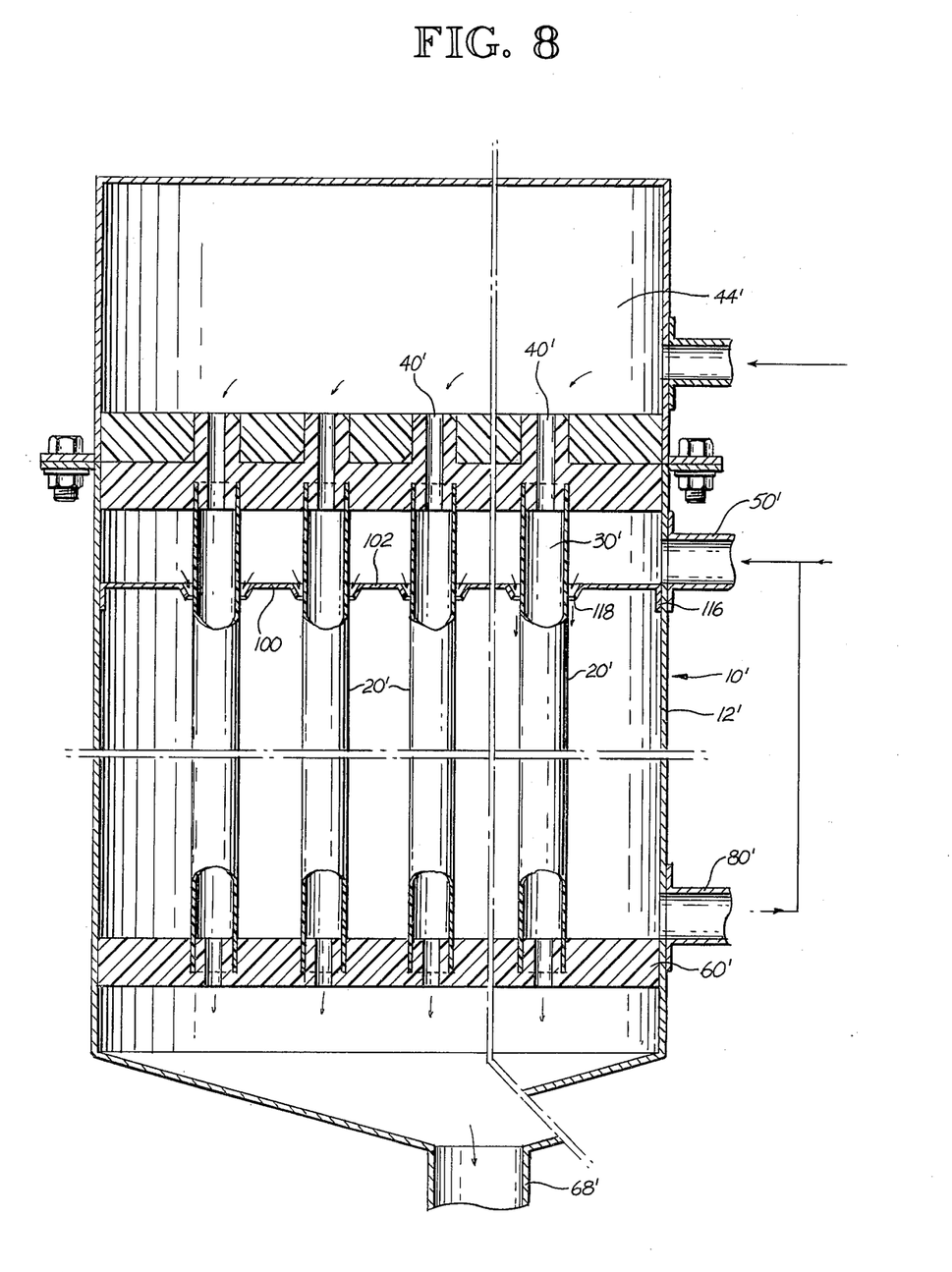
FIG. 8 is a view similar to FIG. 4 of the heat exchange apparatus with the modified structure of FIGS. 6 and 7.

FIGS. 6-8 show a further modified configuration of the present invention. Components of this modified configuration which correspond to components of the embodiments shown in FIGS. 1-5 will be given like numerical designations, with a prime (') designation distinguishing those of the modification. As shown in FIG. 8, there is a heat exchange apparatus 10' having a vertically oriented housing 12' having a plurality of vertically oriented panel units 20'. These panel units 20' have substantially the same configuration and arrangement as shown in FIGS. 1-4 or as shown in FIG. 5.

The main difference in the modified embodiment of FIGS. 6-8 is the arrangement of the upper and lower manifold sections, 16' and 18', respectively. As in the first embodiment, there is an upper steam manifold chamber 44' which directs steam into through openings 40' into the passageways 30' of the panels 20'. However, instead of placing a brine manifold chamber above the chamber 44' (as was done in the first embodiment with the brine chamber 48), there is instead provided a brine distributing structure 100, located just below the upper ends of the panel units 20'.

DESCRIPTION OF THE PREFERRED EMBODIMENT

Since the present invention is particularly adapted for use as a condenser/evaporator heat exchanger in a large scale operation of converting saline water to fresh water, the following description will be directed particularly toward that application. However, it is to be understood that within the broader aspects of the present invention, it could be used in other related applications.

Figures 1, 2, 3:
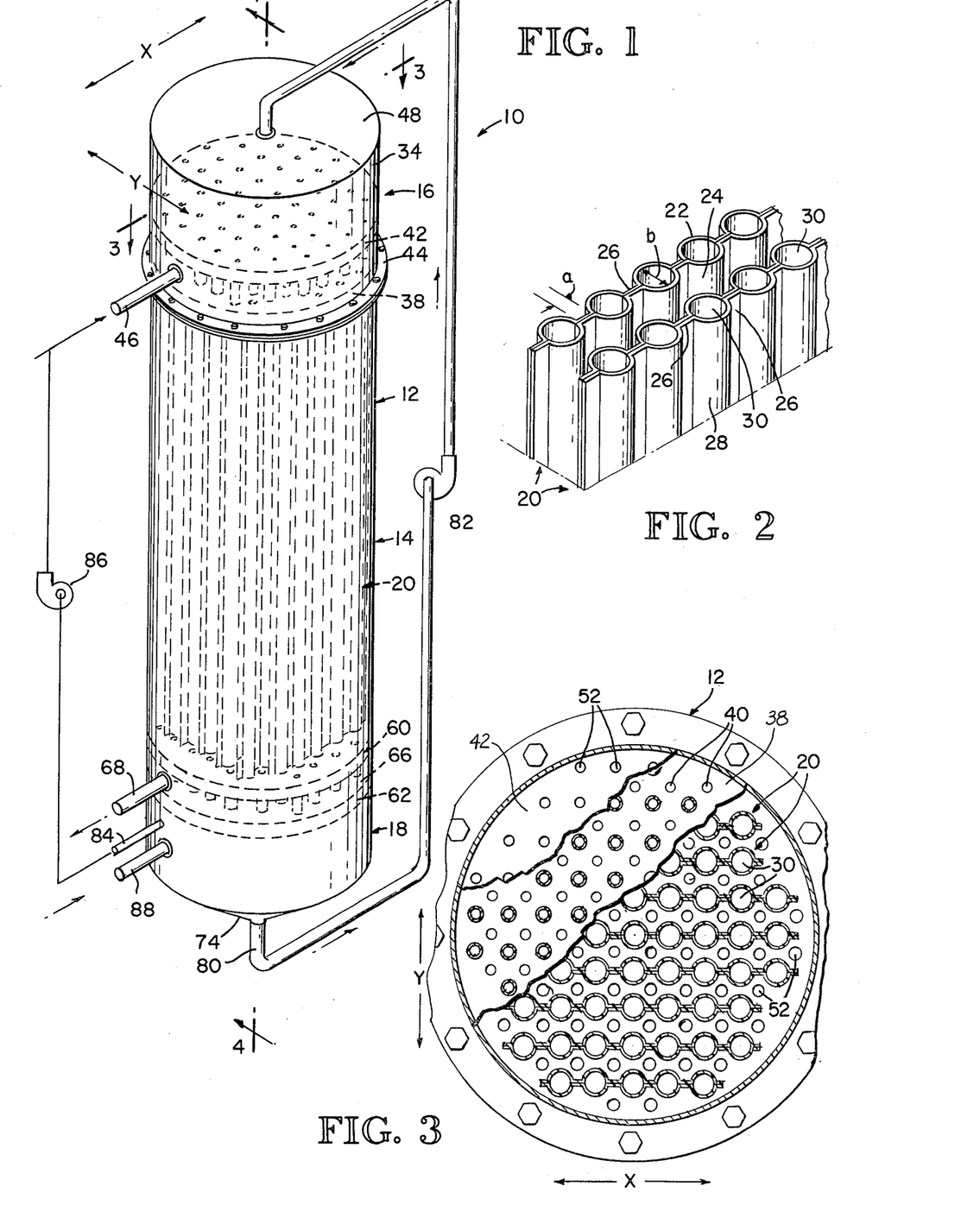
FIG. 1 is an isometric view of the heat exchange apparatus of the present invention.
FIG. 2 is an isometric view of an upper portion of two adjacent panel units of the heat exchange section of the present invention, the panel units being shown separate from the manifold section of the apparatus.
FIG. 3 is a sectional view taken along line 3—3, showing various components broken away to illustrate the arrangement of the upper manifold section of the heat exchange apparatus relative to the panel units in the heat exchange section.
Figure 4:
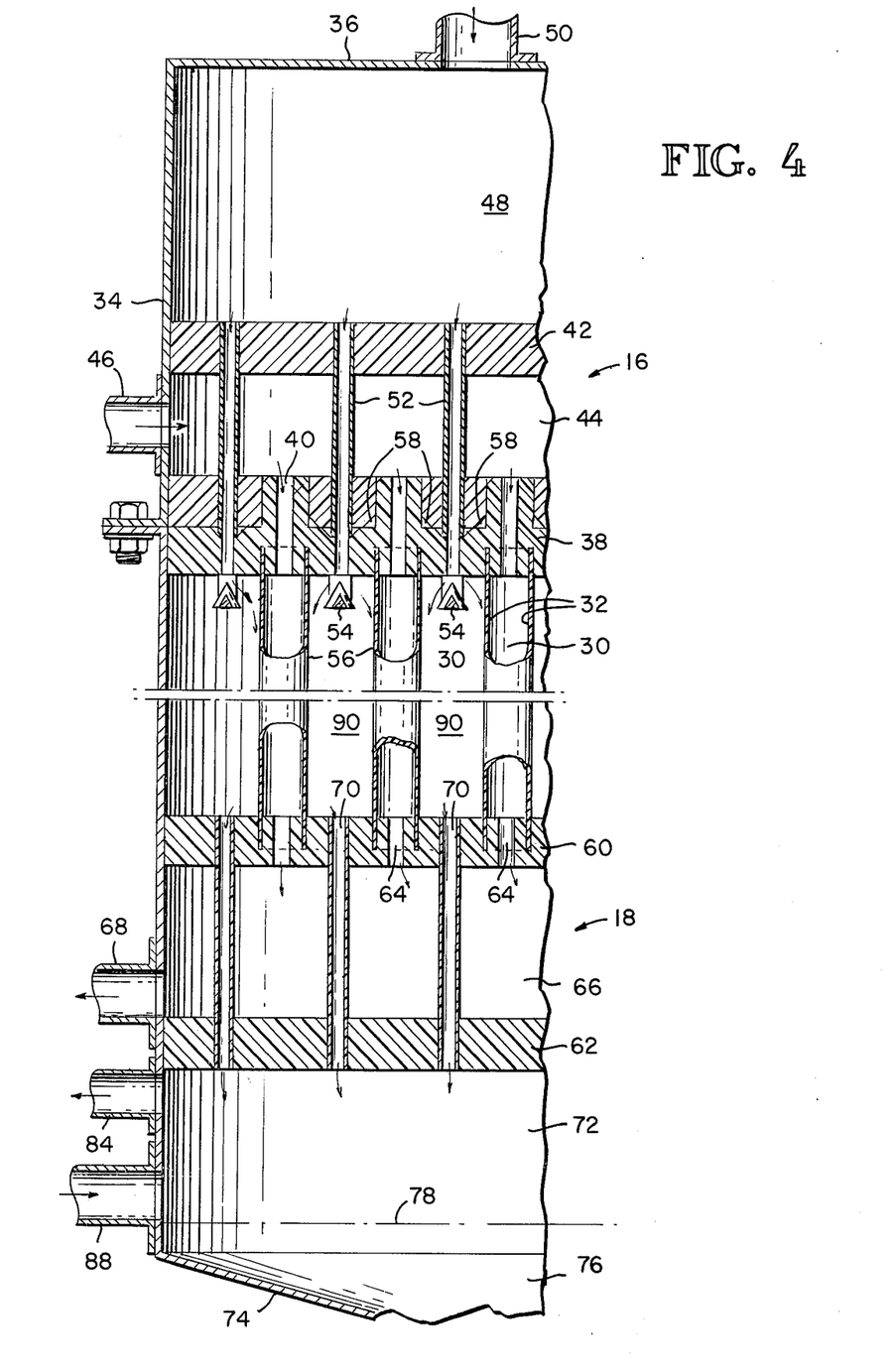
FIG. 4 is a sectional view taken along line 4—4, with most of the middle heat exchange section being deleted, and illustrating in more detail the upper and lower manifold sections.

With reference to FIG. 1, the heat exchange apparatus 10 of the present invention has a vertically oriented housing 12, which in the particular configuration shown herein has a cylindrical configuration. The apparatus 10 has a main middle heat exchange section 14, an upper manifold section 16, and a lower manifold section 18. The heat exchange section 14 comprises a plurality of vertically oriented panel units 20, the arrangement and configuration of which are considered to be critical in the present invention. In describing these panel sections 20, the apparatus 10 will be considered as having a vertical axis, a horizontal "X" axis, and a horizontal "Y" axis perpendicular to the "X" axis.

Each panel unit 20 comprises a pair of generally rectangular thin film plastic sheets 22 and 24 aligned with one another about both the vertical axis and the horizontal "X" axis. The two sheets 22 and 24 are bonded to one another along vertically extending bond lines 26 spaced from one another at regular intervals along the horizontal "X" axis. The sheet portions 28 between adjacent bond lines are expanded from one another in a generally circular configuration to provide a plurality of vertical tubular condensing chambers 30. Thus each chamber 30 is defined by the inner surfaces 32 of two opposing sheet portions 28, and each pair of adjacent chambers 30 are separated from one another by a related double thickness bonded portion 26. (As used herein, the term "bonded" is used in its broad sense of joining two components one to another in some manner, whether this is accomplished by heat sealing, use of a separate bonding medium, or some other means of joining one member to another).

The panel units 20 are spaced from one another a moderate distance at regularly spaced intervals along the horizontal "Y" axis. In the particular configuration shown in FIG. 3, these panel units 20 are so positioned relative to each other that the condensing chambers 30 of the panel units 20 are arranged in a generally rectangular pattern, with the chambers 30 being aligned in rows parallel to the "X" and "Y" axes, and with each adjacent set of four condensing chambers being arranged in a rectangular configuration.

The upper manifold section 16 comprises an upper cylindrical side wall portion 34 of the housing 12, with this side wall portion 34 being closed by a top wall 36. At the upper end of the main heat exchange section 14, there is a horizontal partition 38 extending entirely across the housing 12. This partition 38 is made of a molded material, and the upper edge portions of the panel units 20 are embedded in this molded material so as to be securely bonded therein. At the location of each condensing chamber 30, the partition 38 is formed with a vertical through opening 40.

At a location moderately above the first partition 38, there is a second horizontal partition 42. These two partitions 38 and 42 along with that portion of the side wall 34 located therebetween define a steam manifold chamber 44. Pressurized steam is fed into this manifold chamber 44 through a steam inlet conduit 46 positioned at the side wall portion 34. Pressurized steam in the manifold chamber 44 passes through the openings 40 to pass into the condensing chambers 30 of the units 20.

Located above the steam manifold chamber 44 is a brine manifold chamber 48, this chamber 48 being defined by the second upper partition 42, the housing top wall 36 and that portion of the side wall portion 34 located therebetween. Brine is fed into the manifold chamber 48 through an upper inlet conduit 50 at the top wall 36, with the brine covering the entire upper surface of the partition 42. A plurality of feed tubes 52 extends downwardly from the upper partition 44 to the lower partition 38. At the lower end of each tube 52 there is a nozzle member 54, each of which causes the brine flowing through its related feed tube 50 to be directed in a diverging pattern against the outer surfaces 56 of the panel sections 20.

In the particular arrangement shown in FIG. 3, each feed tube 52 is positioned at a center location equally distant from four adjacent condensing chambers 30 of two adjacent panel units 20. While the particular configuration of the nozzle members 54 is not disclosed in detail herein, it is to be understood that the nozzle members 54 are so arranged that substantially all of the brine flowing therethrough is directed against the outer surfaces 56 of the panel sections 20. Also, to insure that the pressurized steam is properly contained in the chamber 44, suitable seals 58 are provided at appropriate locations at the horizontal partition 38.

The lower manifold section 18 has an upper partition 60 and a lower partition 62, both of which extend entirely across the lower portion of the housing 12. The upper partition 60 is made of a molded material into which the lower edge portions of the panel units 20 are firmly embedded. Also, the upper partition 60 has a plurality of through openings 64, each of which communicates with the lower end of a related condensing chamber 30.

The area between the two partitions 60 and 62 comprises a condensate collecting chamber 66. Condensate which forms on the inner surfaces 32 of the condensing This distributing structure 100 is in the form of a horizontal partition which extends entirely across the upper portion of the housing 12'. As shown in FIGS. 6 and 7 (which show only a portion of the structure 100) the partition wall 102 is formed with elongate openings 104 having substantially the same configuration as the cross-section of related panel units 20'. Thus, each opening 104 has a plurality of circular opening portions 106 at the location of the sheet portions 28, and a narrower opening portion 108 at the location of the bonded sheet portions 26. As shown in FIG. 6, the openings are bordered by an upstanding flange 110 having the same configuration as the elongate openings 104.

In the particular configuration shown in FIG. 6, the entire structure 100 has a peripheral retaining wall 112. Thus, when brine is directed onto the structure 100, the peripheral wall 112 contains the brine on the structure 100 at a moderate depth. The upstanding flanges 108 are provided at their lower ends with a plurality of nozzle openings 114. These openings 114 are selected to be of a size and number so that the brine contained on the structure 100 flows through the openings 114 and onto the outer surfaces of the panel units 20.

A slightly modified configuration of the brine distributing structure 100 is shown in FIG. 8. Instead of having the upstanding peripheral flange 112, there is a downturned flange 116 which forms a water-tight seal with the housing section 12'. Also, instead of having nozzles 114, the structure 100 in FIG. 8 is provided with downwardly directed nozzle-like openings 118 which direct brine located above the partition 102 downwardly onto the outer surfaces of the panels 20'. As in the prior embodiment, brine is directed into the apparatus through a suitable inlet 50', which in the present modified embodiment is located just above the brine distribution chamber 100.

At the lower end of the housing 12', the falling brine is collected on the horizontal partition 60' and recirculated through a conduit 80' back to the upper brine inlet conduit 50'. Vapor which forms in the main evaporating area between the panels 20' is taken out through a suitable outlet (not shown for convenience of illustration in FIG. 8) located at the mid-height of the housing 12' or at some other location.

The mode of operation of the modified configuration shown in FIGS. 6 and 8 is substantially the same as in the first embodiment, so it will not be described in detail herein. The main difference is simply in the manner of directing the brine as a falling film on the outside of the panels 20', and the manner of collecting the brine at the lower end of the housing 12'.

It is to be understood that within the broader aspects of the present invention, certain modifications could not be made without departing from the spirit of the present invention.

What is claimed is:

1. A method of accomplishing heat exchange between a first liquid medium and a second vaporized medium which is to be condensed by being placed in heat exchange relationship with said first liquid medium, said method comprising:
   a. providing a heat exchange apparatus having a heat exchange section with a vertical axis, a horizontal "X" axis, and a horizontal "Y" axis perpendicular to the "X" axis, said heat exchange section comprising a plurality of heat exchange panel units, each of said panel units having an upper end and a lower end, and comprising:
      1. a pair of thin film sheets having inner and outer surfaces and aligned with one another along said vertical axis and said horizontal "X" axis, said sheets being joined to one another at their inner surfaces along a plurality of vertically extending bond line portions spaced from one another at generally regular intervals along said horizontal "X" axis,
      2. said pair of sheets defining therebetween a plurality of vertical tubular condensing chambers adapted to receive said pressurized gaseous condensing medium therein, each chamber in its pressurized condition being defined by inner surfaces of two single thickness sheet portions of said two sheets, and each chamber being separated from an adjacent chamber of the same panel unit by a related double thickness bond line portion of the two sheets,
      said panel units being aligned generally parallel to the vertical axis and the "X" axis, said panel units being positioned adjacent one another and spaced from one another at geneally regular intervals along the "Y" axis so as to provide pairs of adjacent panel units, each pair of panel units defining therebetween an evaporating area,
   b. directing said vaporized heat exchange medium under pressure into said condensing chambers,
   c. directing said liquid evaporating medium as falling films onto the outer surfaces of the panel units at the upper end thereof,
   whereby said liquid medium is placed in heat exchange relationship with said gaseous medium across the single thickness portion defining the condensing chambers,
   said method being further characterized in that:
   a. said sheets are made of a thin film plastic material having a thickness dimension between 0.0005 to 0.010 inch,
   b. the bond line portions of each of the panel units have a width dimension between about 0.02 to 0.40 inch,
   c. the diameter of each of the condensing chambers is between about 0.25 to 2.0 inch, and
   d. said panel units are spaced from one another along said "Y" axis between about 0.20 to 3.0 inches.

2. The method as recited in claim 1 wherein;
   a. said sheets are made of a thin film plastic material having a thickness dimension between 0.002 to 0.004 inch,
   b. the bond line portions of each of the panel units have a width dimension between about 0.05 to 0.10 inch, and
   c. the diameter of each of the condensing chambers is between about 0.75 to 1.5 inch.

3. A condenser/evaporator heat exchange apparatus, by which liquid evaporating medium, such as brine, is placed in heat exchange relationship with a pressurized gaseous condensing medium, such as steam, said apparatus comprising:
   a. a heat exchange section having a vertical axis, a horizontal "X" axis and a horizontal "Y" axis perpendicular to the "X" axis, said heat exchange section comprising a plurality of heat exchange panel units, each of said panel units having an upper end and a lower end, and comprising:
      1. a pair of thin film plastic sheets having inner and outer surfaces and aligned with one another along said vertical axis and said horizontal "X" axis, said sheets being joined to one another at their inner surfaces along a plurality of vertically extending bond line portions spaced from one another at generally regular intervals along said horizontal "X" axis, 2. said pair of sheets defining therebetween a plurality of vertical tubular condensing chambers adapted to receive said pressurized gaseous condensing medium therein, each chamber in its pressurized condition being defined by inner surfaces of two single thickness sheet portions of said two sheets, and each chamber being separated from an adjacent chamber of the same panel unit by a related double thickness bond line portion of the two sheets, b. said panel units being aligned generally parallel to the vertical axis and the "X" axis, said panel units being positioned adjacent one another and spaced from one another at generally regular intervals along the "Y" axis so as to provide pairs of adjacent panel units, each pair of panel units defining therebetween an evaporating area, c. means to direct said pressurized gaseous condensing medium into said condensing chambers, d. means to direct said liquid evaporating medium as falling liquid films onto the outer surfaces of the panel units at the upper ends thereof, whereby said liquid medium is placed in heat exchange relationship with said gaseous medium across the single thickness sheet portions defining the condensing chambers, said apparatus being further characterized in that:

a. said sheets are made of a thin film plastic material having a thickness dimension between 0.0005 to 0.010 inch, b. the bond line portions of each of the panel units have a width dimension between about 0.02 to 0.40 inch, c. the diameter of each of the condensing chambers is between about 0.25 to 2.0 inch, and d. said panel units are spaced from one another along said "Y" axis between about 0.20 to 3.0 inches.

4. The apparatus as recited in claim 3, wherein said panel units are positioned relative to each other so that the chambers of adjacent panel units are arranged in a generally rectangular configuration, with the condensing chambers being arranged in rows generally parallel to the "X" axis and parallel to the "Y" axis.

5. The apparatus as recited in claim 3, wherein alternate panel units are offset from one another along the "X" axis, in a manner that condensing chambers of a first set of alternate panel units are offset along the "X" axis from the condensing chambers of a set of second alternate panel units positioned intermittently with the first set of panel units, by a distance equal to approximately one half of the spacing of condensing chambers of a single panel unit.

6. The apparatus as recited in claim 3, wherein:

a. said sheets are made of a thin film plastic material having a thickness dimension between 0.002 to 0.004 inch, b. the bond line portions of each of the panel units have a width dimension between about 0.05 to 0.10 inch, and c. the diameter of each of the condensing chambers is between about 0.75 to 1.5 inch.

7. The apparatus as recited in claim 1, wherein said means for directing said liquid evaporating medium comprises a distributing structure which in turn comprises a horizontal partition at upper end portions of said panel units, said horizontal partition having horizontal openings corresponding to cross sectional configuration of said panel units, said horizontal openings being bordered by upstanding flange means having nozzle openings to permit flow of the evaporating medium onto said panel units.

* * * * *